(12) United States Patent
Swartzendruber

(10) Patent No.: US 6,427,430 B1
(45) Date of Patent: Aug. 6, 2002

(54) PEDAL LIFT SYSTEM FOR LAWN TRACTOR MOWER DECK

(75) Inventor: James A. Swartzendruber, West Bend, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/900,215

(22) Filed: Jul. 6, 2001

Related U.S. Application Data

(63) Continuation-in-part of application No. 09/638,991, filed on Aug. 15, 2000.

(51) Int. Cl.$^7$ ................................................ A01D 34/00
(52) U.S. Cl. ......................... 56/16.3; 56/14.9; 56/17.1
(58) Field of Search ........................... 56/12.7, 14.7, 56/14.9, 15.7, 15.8, 15.9, 16.3, 16.7, 17.1, DIG. 22

(56) References Cited

U.S. PATENT DOCUMENTS

| | | | |
|---|---|---|---|
| 2,945,338 A | * 7/1960 | Burrows et al. | ........ 56/DIG. 22 |
| 3,608,288 A | * 9/1971 | Heth et al. | ................... 56/15.8 |
| 3,706,188 A | * 12/1972 | Quiram | ...................... 56/15.8 |
| 4,120,136 A | * 10/1978 | Rose | .......................... 56/17.1 |
| 4,291,522 A | 9/1981 | Kawasaki et al. | |
| 4,577,455 A | * 3/1986 | Amano et al. | ................ 56/17.1 |
| 4,760,687 A | 8/1988 | Siegrist | |
| 4,869,057 A | 9/1989 | Siegrist | |
| 5,138,825 A | 8/1992 | Trefz et al. | |
| 5,142,850 A | 9/1992 | Patterson et al. | |
| 5,187,925 A | 2/1993 | Patterson et al. | |
| 5,351,467 A | 10/1994 | Trefz et al. | |
| 5,381,648 A | 1/1995 | Seegert et al. | |
| 5,816,033 A | * 10/1998 | Busboom et al. | ............. 56/17.1 |
| 5,927,055 A | 7/1999 | Ferree et al. | |
| 5,970,690 A | 10/1999 | Toman | |
| 6,122,903 A | * 9/2000 | Hayashi et al. | ............... 56/15.8 |

OTHER PUBLICATIONS

Photographs—Turf Tiger.

* cited by examiner

Primary Examiner—Robert E. Pezzuto
Assistant Examiner—Nathan Mammen

(57) ABSTRACT

A foot pedal lift system is provided for the mower deck of a lawn or garden tractor. The foot pedal is pivotally mounted to the frame of the tractor and is linked to the linkage arms which suspend the mower deck from the frame. The pedal is movable between a depressed forward position to raise the mower deck to a transport position and a retracted rearward position to move the mower deck to a lower removal position. The pedal can be locked in the depressed or retracted positions by a latch pivotally mounted on the exterior of the tractor console. Engagement and disengagement of the latch with the foot pedal is controlled by a handle mounted on the console connected to the latch by an elongated connecting rod. Pulling upwardly on the handle locks the latch into engagement with the foot pedal in both the depressed and retracted positions. Pushing downwardly on the handle disengages the latch from the foot pedal so that the mower deck is free to move upwardly or downwardly.

4 Claims, 7 Drawing Sheets

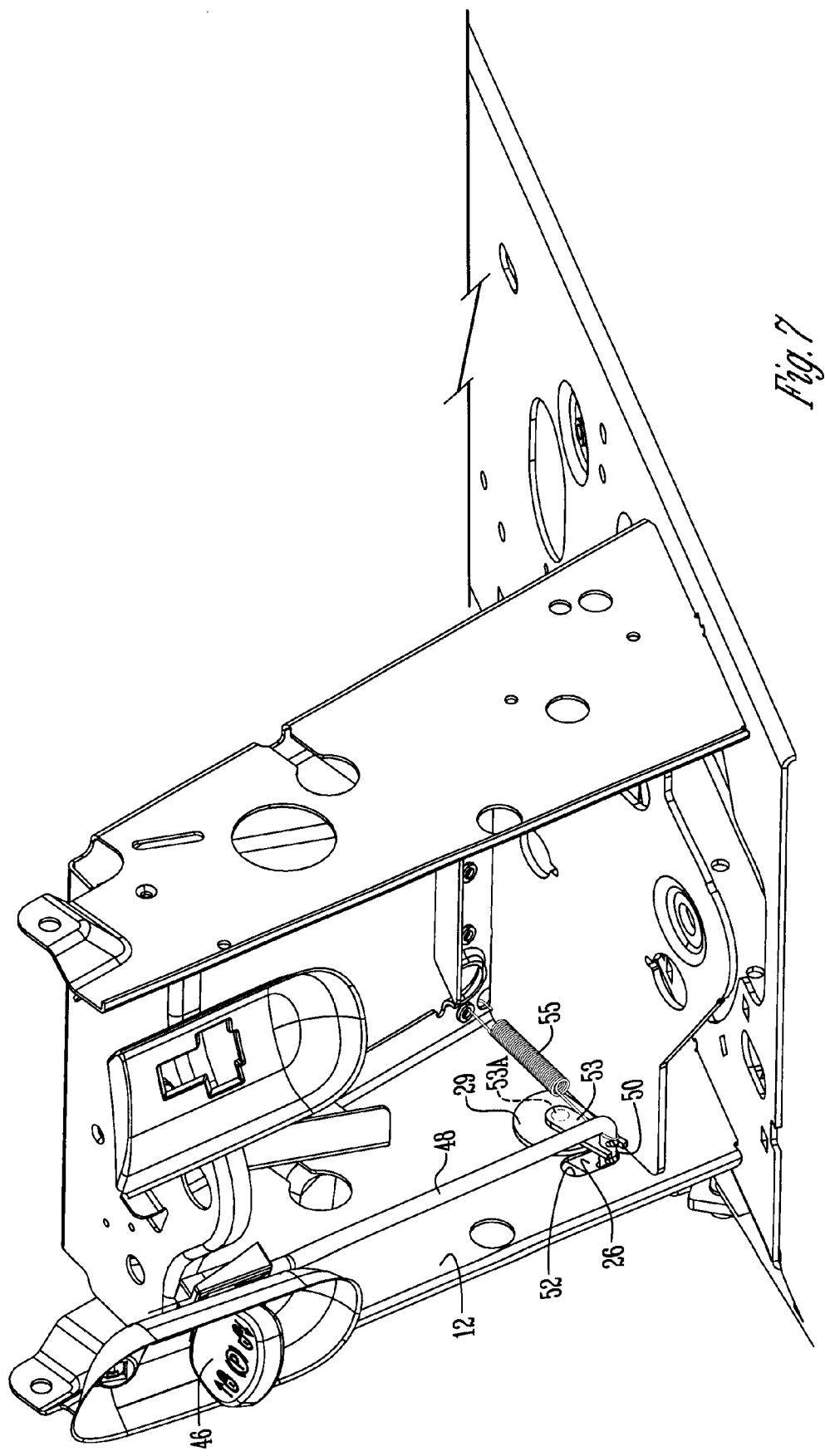

PEDAL LIFT SYSTEM FOR LAWN TRACTOR MOWER DECK

CROSS-REFERENCE TO RELATED APPLICATIONS

This application is a Continuation-In-Part of pending application U.S. Ser. No. 09/638,991 filed on Aug. 15, 2000.

BACKGROUND OF THE INVENTION

1 Field of the Invention

The present invention relates generally to lawn and garden tractors having a mowing deck, and more specifically, to a foot pedal system for raising and lowering the deck.

2 Related Art

Lawn and garden tractors conventionally have a mower deck suspended from a frame, with the deck being raised and lowered by means of a hand-actuated lever. Such a hand lever necessarily requires strength in the operator's arm and back. Movement of the hand lever includes a risk of back strain to the operator, who normally is bending over or leaning forward from the tractor seat to operate the lever. Full raising of the deck is particularly desirable for transport of the tractor when the mower blades are not engaged for cutting. Complete lowering of the deck is necessary when the deck is to be removed from the tractor for maintenance or other purposes.

BRIEF SUMMARY OF THE INVENTION

Therefore, a primary objective of the present invention is the provision of a pedal lift system for raising and lowering the mower deck of a lawn or garden tractor.

Another objective of the present invention is the provision of a foot pedal for use by a person sitting on the seat of a lawn or garden tractor to raise and lower the mower deck.

A further objective of the present invention is the provision of foot pedal lift system for a lawn tractor mower deck which can be quickly and easily actuated for raising and lowering the mower deck.

Another objective of the present invention is the provision of a foot pedal for raising and lowering the mower deck of a lawn or garden tractor which can be latched to retain the deck in a raised or lowered position.

In accordance with the above objectives, the lawn tractor of the present invention has a foot pedal pivotally mounted to the frame and linked to the deck to move the deck between a raised transport position and a lowered deck-removal position. A latch is pivotally mounted to an exterior portion of the tractor console, and is adapted to engage the foot pedal to retain the pedal in a forward depressed position wherein the deck is raised and a rearward retracted position wherein the deck is lowered. A manually operated handle mounted on the console is connected to the latch so as to manually actuate the latch for engagement with or disengagement from the foot pedal. A spring extends between the frame and the foot pedal to bias the pedal toward the forward position.

The objectives, features and advantages of the present invention will become apparent to one skilled in the art upon reading the following detailed description in view of the drawings.

BRIEF DESCRIPTION OF THE DRAWINGS

FIG. 7 is a perspective view showing an internal portion of the tractor console with the latch and connecting rod.

DESCRIPTION OF THE PREFERRED EMBODIMENT

Figure 1:
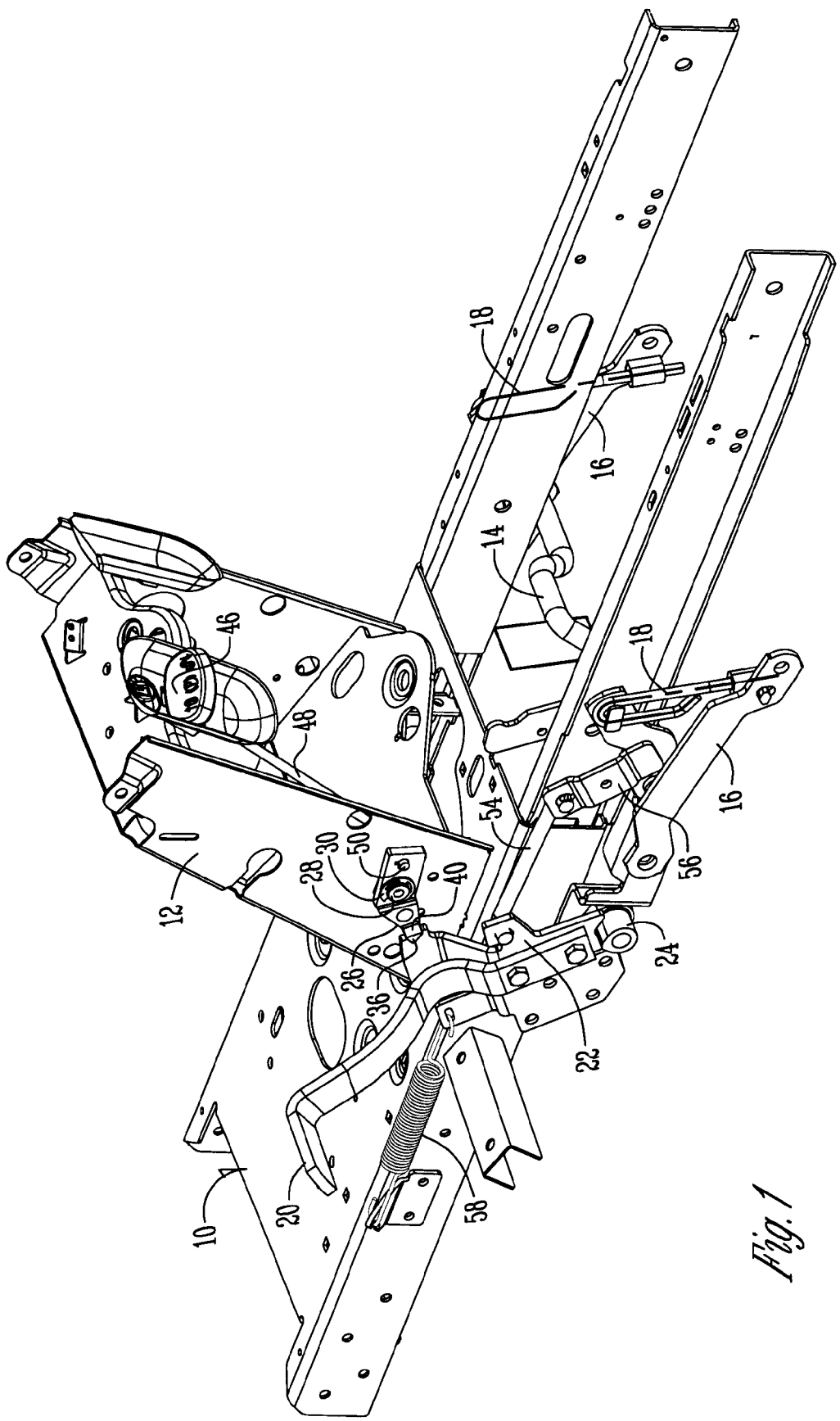
FIG. 1 is a rear perspective view of the lawn tractor frame with the foot pedal of the present invention latched in a forward position.

The improved lawn or garden tractor of the present invention includes a frame 10 with a console 12 mounted thereon. The frame 10 is supported by wheels (not shown), and a motor (not shown) is mounted on the frame for driving the wheels. A seat (not shown) is also provided upon which an operator can sit. The console 12 includes the ignition and steering wheel, as well as other controls (not shown). A mower deck (not shown) is suspended from the frame 10 on a rock shaft 14 and linkages, including lift links 16 and lost motion links 18. The rock shaft 14 is connected to an adjustment assembly, including a stepped wheel (not shown), to adjust the height of the mower deck.

The above described structure of the tractor is conventional, and does not constitute a part of the present invention.

Figure 3:
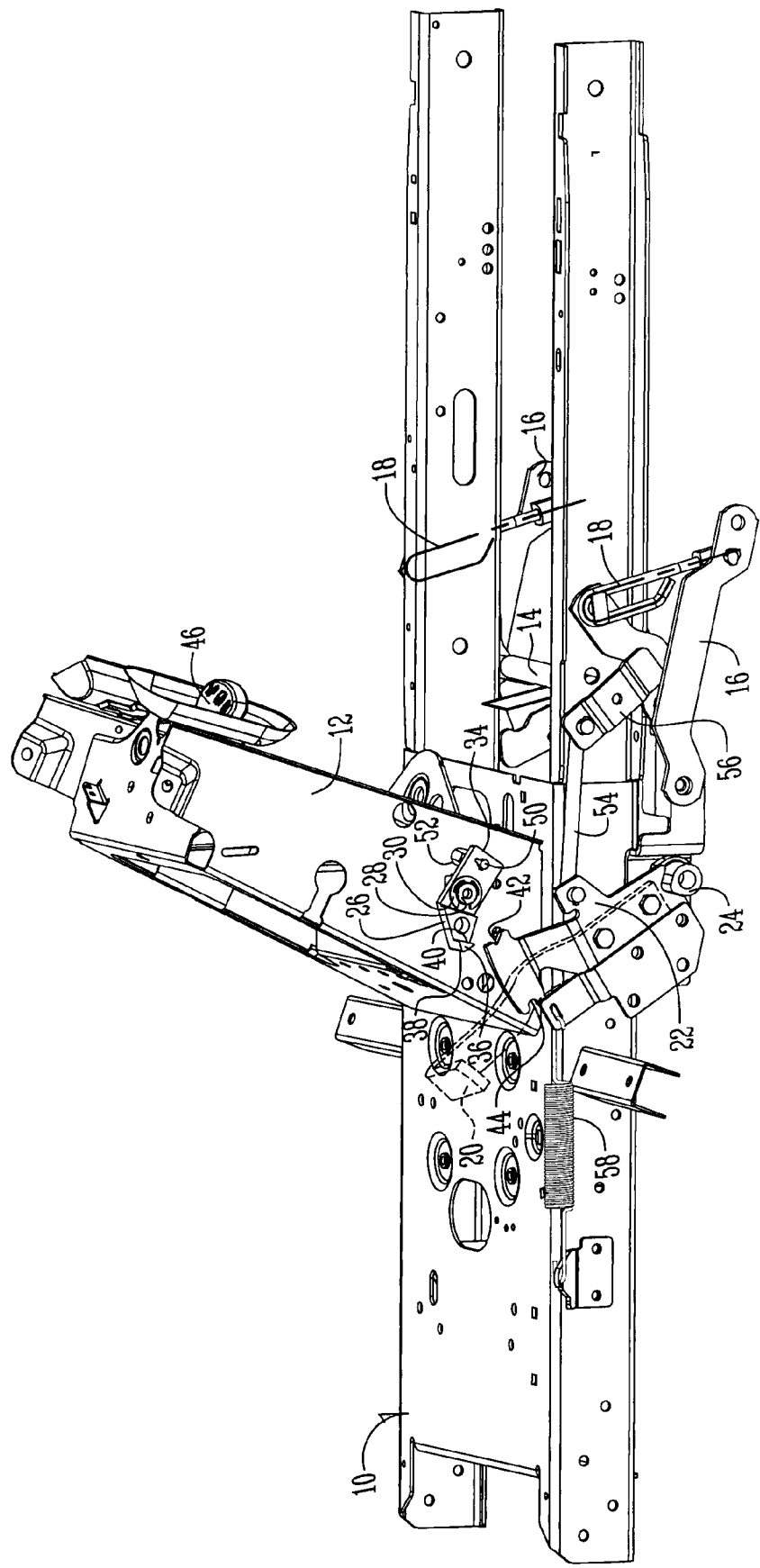
FIG. 3 is a view similar to FIG. 2 showing the foot pedal in an unlatched rearward position.
Figure 4:
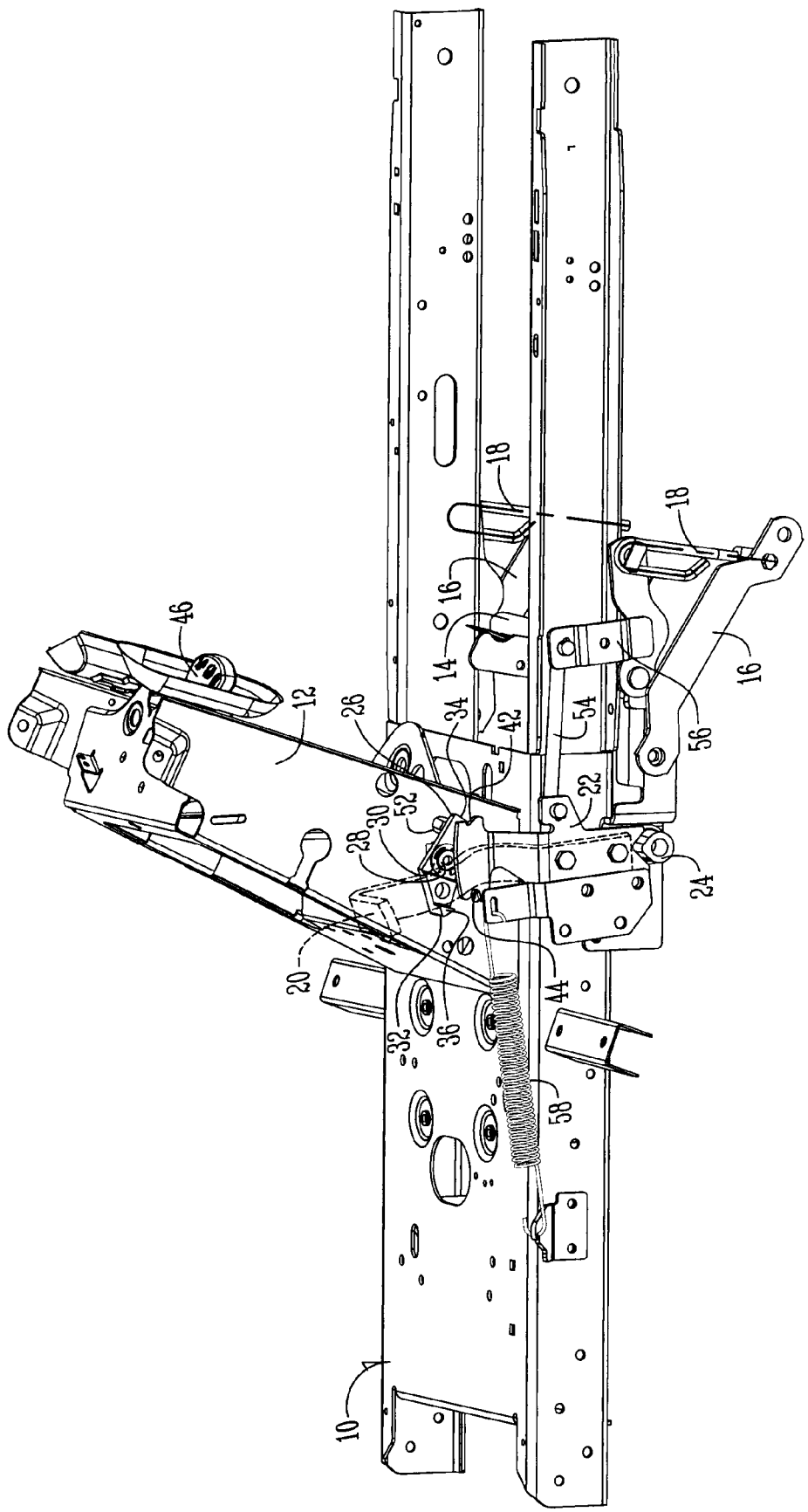
FIG. 4 is a view similar to FIG. 3 showing the foot pedal in an unlatched rearward position.

The present invention is directed towards a pedal lift system for moving the mower deck between a raised transport position and a lowered deck-removal position. More particularly, the pedal lift system of the present invention includes a foot pedal 20 connected to a plate 22. The plate 22 is mounted on a collar or shaft 24 which is pivotally mounted on the frame 10, such that the foot pedal 20 and plate 22 are pivotal about the horizontal axis of the collar 24. The foot pedal is movable between a depressed forward position, shown in FIGS. 1 and 2, and a retracted rearward position, shown in FIGS. 3, 4 and 5.

A latch 26 is pivotally mounted to an external portion of the console 12. The latch is adapted to engage the plate 22 so as to retain the foot pedal 20 in the forward and retracted positions.

More particularly, the latch 26 is mounted on a hollow shaft 28 and retained by a clip 30. The shaft 28 extends through a hole in the console, and has an enlarged flange 29 on the backside which is welded to the inner surface of the console 12, as seen in FIG. 7.

Figure 2:
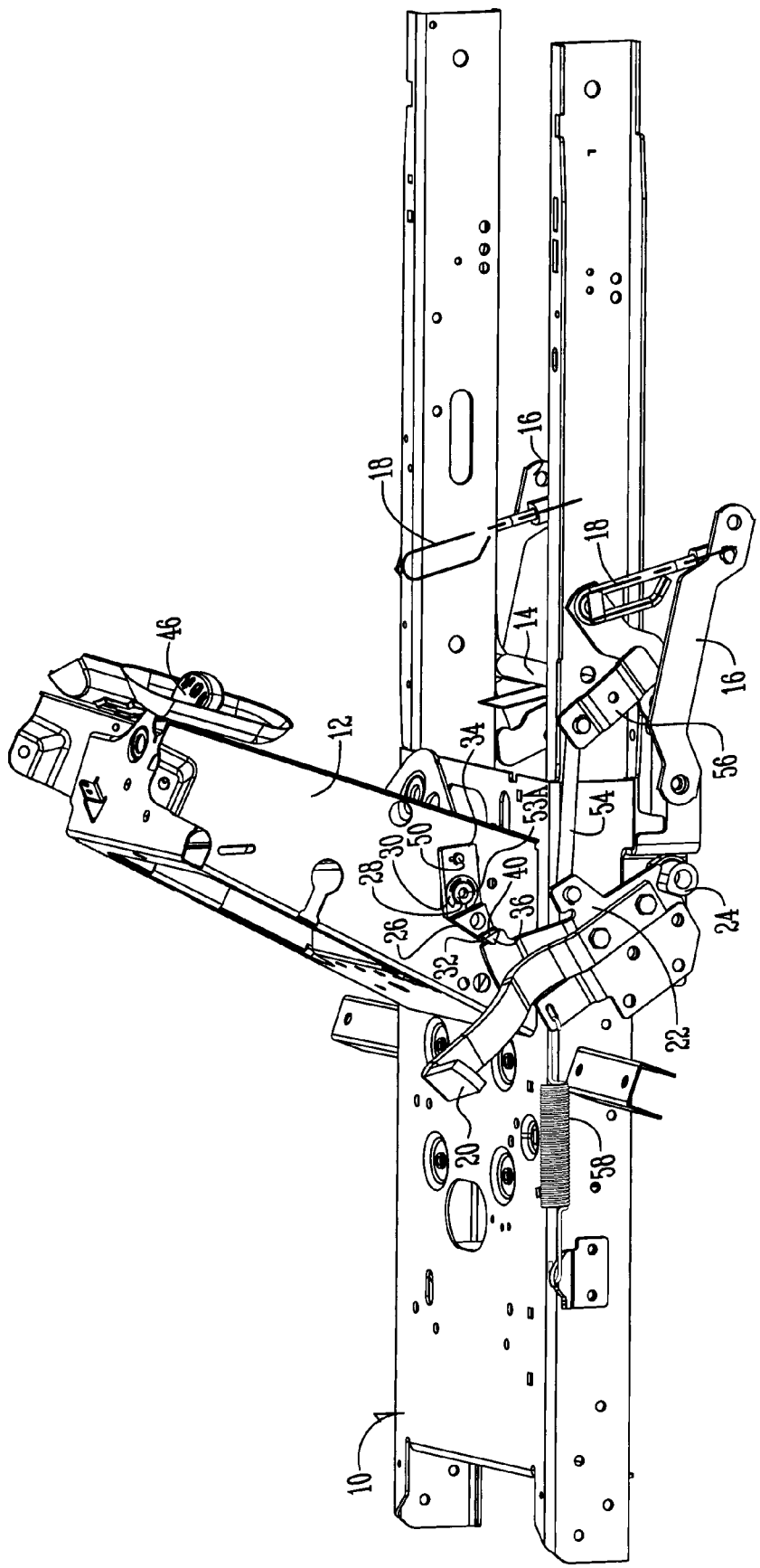
FIG. 2 is another perspective view of the tractor frame with the foot pedal latched in the forward position.
Figure 5:
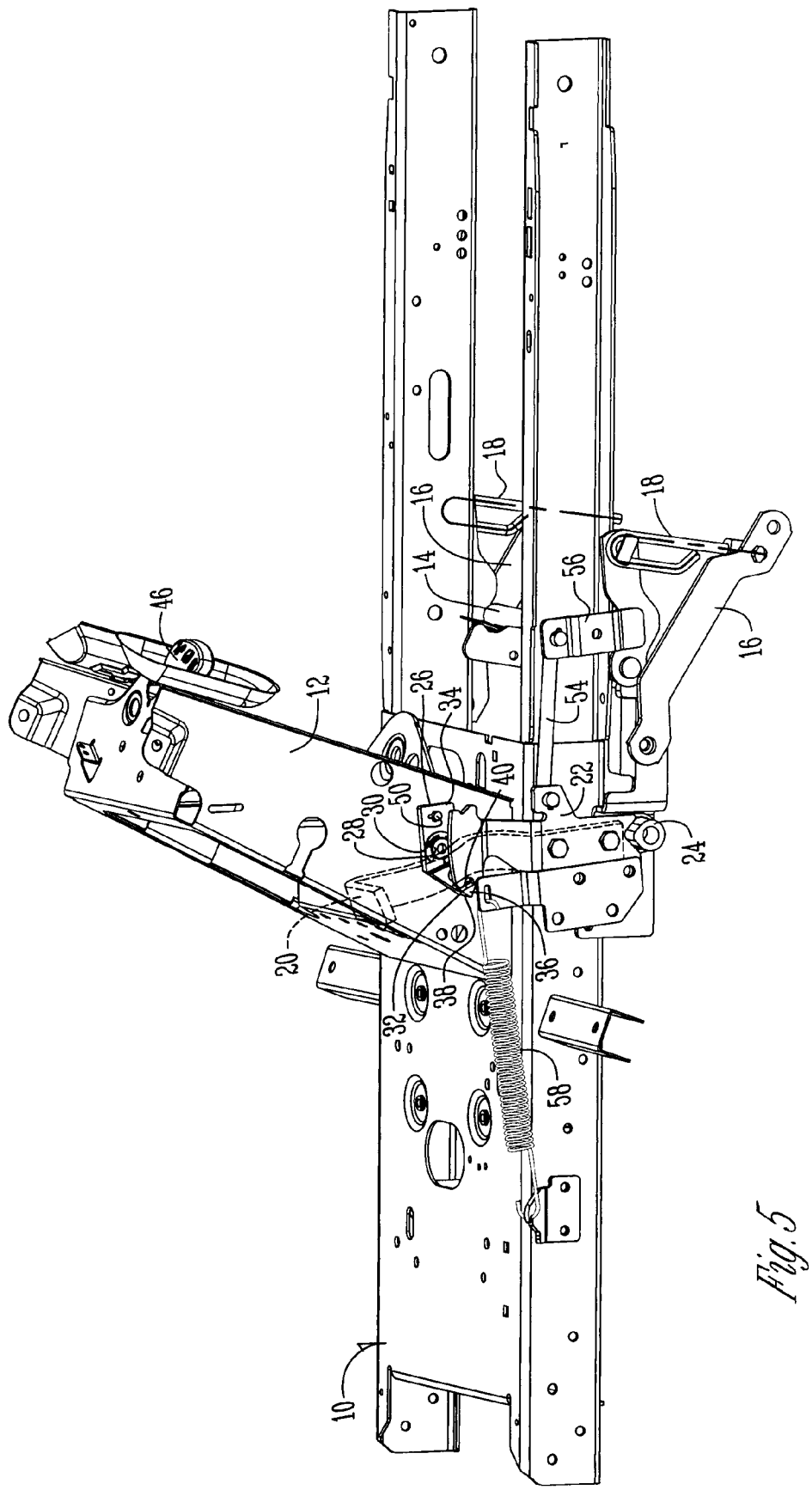
FIG. 5 is a view similar to FIG. 2 showing the foot pedal latched in the rearward retracted position.
Figure 6:
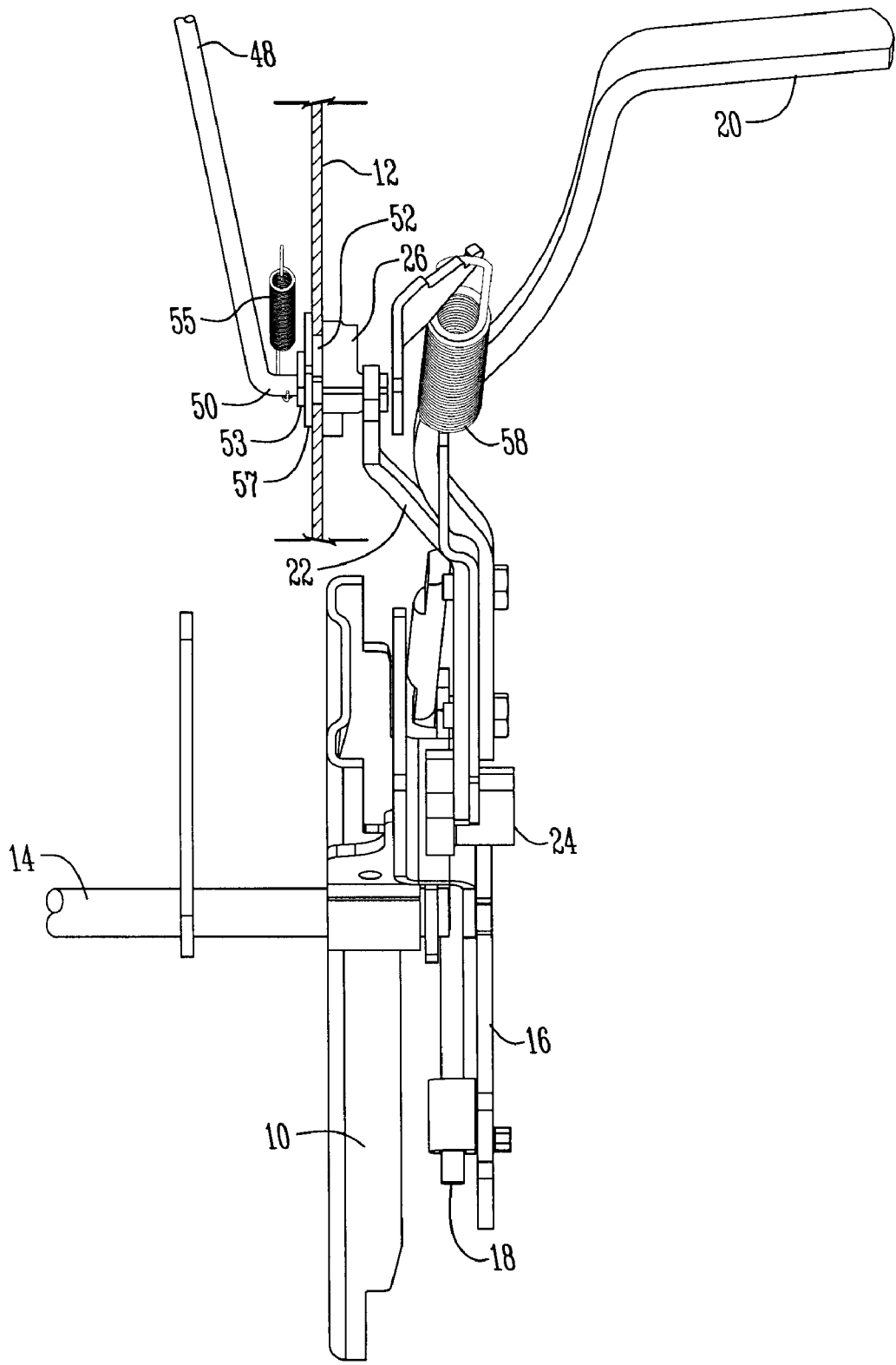
FIG. 6 is a partial front elevation view showing the foot pedal and latch assembly.

The latch 26 includes opposite first and second ends 32, 34. The first end 32 of the latch 26 includes an outwardly extending projection 36 having opposing forward and rearward sides 38, 40, respectively. The forward surface 38 of the projection 36 is adapted to engage a rear notch 42 on the plate 22 so as to retain the foot pedal 20 in the forward position, as seen in FIGS. 1 and 2. The rearward surface 40 of the projection 36 is adapted to engage a front notch 44 on the plate 22 to retain the foot pedal 20 in the rearward position, as seen in FIG. 5.

Movement of the latch 26 is accomplished by a control member including a handle 46 projecting from the console 12 and a connecting rod 48 extending between the handle 46 and the latch 26. The lower end 50 of the connecting rod 48 extends through a slot 52 in the sidewall of the console 12 and is secured to the second end 34 of the latch 26 by a pin or any other convenient means. The latch includes an inner yoke 53 extending along the inner wall of the console 12, as seen in FIG. 7. The yoke 53 has a stub shaft 53A, as seen in FIG. 2, extending into the hollow shaft 28. The end 50 of the connecting rod 48 is retained in the yoke 53 by a spring 55 hooked around the rod 48 and a portion of the console 12. The spring 55 serves as an over-center spring holding the rod 48 and yoke 53 in the raised or lowered position within the slot 52.

The handle 46 can be pulled upwardly by the operator, thereby pulling the rod 48 upwardly so as to pivot the latch 26 in a counterclockwise direction as seen in FIG. 1 so as to engage one end or the other of the plate 22. Conversely, when the handle 46 is pushed downwardly, the connecting rod 48 moves downwardly within the slot 52 to pivot the latch 26 in a clockwise direction, as seen in FIG. 1, so as to disengage the latch 26 from the plate 22.

The pivotal movement of the foot pedal 20 is transferred to the mower deck by a rod or link 54 extending between the plate 22 and a linkage arm 56. Thus, when the foot pedal 20 is depressed to pivot to the forward position, the plate 22 pulls the rod 54 and linkage arm 56 forwardly to thereby raise the mower deck to the transport position. The handle 46 is then pulled upwardly such that the forward side of the projection 36 of the latch 26 engages the rear notch 42 on the plate 22 so as to retain the mower deck in the transport position. An optional spring 58 extends between the frame 10 and the plate 22 so as to urge the plate 22 and the foot pedal 20 toward the depressed forward position, thereby facilitating movement of the mower deck to the raised position.

When it is desired to lower the mower deck from the transport position, the foot pedal 20 is depressed slightly further, and the handle 46 is pushed downwardly so as to pivot the latch 26 out of engagement with the rear notch 42 of the plate 22. The foot pedal 20 can then be released, such that the mower deck will move downwardly by gravity, overcoming the bias of the spring 58, if so equipped. The deck can be moved to a lower most removal position in engagement with the ground for removal in a conventional manner. When the deck is fully lowered, the foot pedal 20 and the plate 22 will be in the position shown in FIG. 4. The deck can be locked against movement away from the removal position by pulling the handle 46 upwardly so as to pivot the latch 26 such that the rear side 40 of the projection 36 engages the forward notch 44 of the plate 22, as seen in FIG. 5.

Whereas the invention has been shown and described in connection with the preferred embodiment thereof, it will be understood that any modifications, substitutions, and additions may be made which are within the intended broad scope of the following claims. From the foregoing, it can be seen that the present invention accomplishes at least all of the stated objectives.

What is claimed is:

1. An improved lawn wheel mounted tractor having a frame with a mower deck suspended beneath the frame, the improvement comprising, a foot pedal operatively connected to the deck and pivotally mounted to the frame for movement between forward and rearward positions to move the deck between an upper transport position and a lower removal position, respectively;

a plate mounted on the pedal and having opposite rearward and forward ends with each end having a notch therein, a console on the frame adjacent the pedal, a latch pivotally mounted on the console adjacent a pivotal path of the foot pedal, a projection on the latch adapted to be received in one or the other of the notches on the opposite rearward and forward ends of the plate depending on the relative pivotal positions of the latch and the foot pedal, such that when the projection is in one or the other of the notches, the deck will be in the upper transport position or the lower removal position, a manual lift rod on the frame and operatively connected to the latch for selectively pivoting the latch, and a spring on the frame having one end connected to the frame and the other end to the rod to yieldably hold the projection on the latch in connection with one or the other of the notches on the opposite rearward and forward ends of the plate.

2. The tractor of claim 1 wherein the spring and lift rod are within the console, and the latch is operatively connected to the lift rod through an opening in the console.

3. The tractor of claim 1 further comprising a spring extending between the frame and pedal to bias s the pedal toward the forward position.

4. The lawn mower of claim 1 where in the latch is disengagable from the pedal such that the deck will move by gravity to a lower position and thereby retract the foot pedal.

* * * * *